United States Patent
Gottesfeld

(10) Patent No.: US 6,686,081 B2
(45) Date of Patent: Feb. 3, 2004

(54) METHODS AND APPARATUSES FOR A PRESSURE DRIVEN FUEL CELL SYSTEM

(75) Inventor: Shimson Gottesfeld, Niskayuna, NY (US)

(73) Assignee: MTI Microfuel Cells, Inc., Albany, NY (US)

( * ) Notice: Subject to any disclaimer, the term of this patent is extended or adjusted under 35 U.S.C. 154(b) by 367 days.

(21) Appl. No.: 09/855,982

(22) Filed: May 15, 2001

(65) Prior Publication Data

US 2003/0031907 A1 Feb. 13, 2003

(51) Int. Cl.[7] .................................................. H01M 8/10
(52) U.S. Cl. ............................ 429/30; 429/32; 429/34; 429/35; 429/19; 429/22; 429/25; 429/13; 429/17
(58) Field of Search .................... 429/13, 17, 19, 429/25, 22, 30, 32, 34, 35

(56) References Cited

U.S. PATENT DOCUMENTS

| | | | | |
|---|---|---|---|---|
| 4,420,544 A | | 12/1983 | Lawson et al. ................ | 429/13 |
| 4,629,664 A | | 12/1986 | Tsukui et al. ................. | 429/23 |
| 4,657,828 A | * | 4/1987 | Tajima ......................... | 429/12 |
| 4,659,634 A | * | 4/1987 | Struthers ..................... | 429/19 |
| 5,165,483 A | * | 11/1992 | Fox .............................. | 169/47 |
| 5,573,866 A | | 11/1996 | Van Dine et al. ............ | 429/13 |
| 5,599,638 A | | 2/1997 | Surampudi et al. .......... | 429/33 |
| 5,773,162 A | | 6/1998 | Surampudi et al. .......... | 429/39 |
| 5,795,496 A | | 8/1998 | Yen et al. ................... | 252/62.2 |
| 5,945,231 A | | 8/1999 | Narayanan et al. .......... | 429/30 |
| 5,985,474 A | * | 11/1999 | Chen et al. .................. | 429/17 |
| 5,992,008 A | | 11/1999 | Kindler ....................... | 29/730 |
| 6,146,781 A | | 11/2000 | Surampudi et al. .......... | 429/35 |
| 6,254,748 B1 | * | 7/2001 | Surampudi et al. ......... | 204/422 |
| 6,265,093 B1 | * | 7/2001 | Surampudi et al. .......... | 429/13 |
| 6,303,244 B1 | * | 10/2001 | Surampudi et al. .......... | 429/17 |
| 6,387,559 B1 | * | 5/2002 | Koripella et al. ............. | 429/34 |
| 6,420,059 B1 | * | 7/2002 | Surampudi et al. .......... | 429/13 |
| 6,429,019 B1 | * | 8/2002 | Goldstein et al. .......... | 436/134 |
| 6,497,975 B2 | * | 12/2002 | Bostaph et al. ............. | 429/38 |
| 6,503,651 B1 | * | 1/2003 | Nguyen ....................... | 429/34 |
| 6,534,210 B2 | * | 3/2003 | Luken et al. ................. | 429/13 |

FOREIGN PATENT DOCUMENTS

| | | |
|---|---|---|
| DE | 197 22 598 A1 | 12/1998 |
| JP | 58-016471 A | 1/1983 |
| JP | 63-202861 A | 8/1988 |
| JP | 04-274170 A | 9/1992 |

OTHER PUBLICATIONS

Invitation to Pay Additional Fees date of mailing Sep. 25, 2002.

* cited by examiner

*Primary Examiner*—Bruce F. Bell
(74) *Attorney, Agent, or Firm*—Mintz, Levin, Cohn, Ferris, Glovsky and Popeo, P.C.

(57) ABSTRACT

A fuel cell system including a housing defining an anode chamber and a cathode chamber and including a catalyst, a protonically conductive, but electronically non-conductive membrane positioned between the anode chamber and the cathode chamber and a first vent, a fuel chamber in gaseous communication with the anode chamber via a first valve, a liquid chamber in gaseous communication with the anode chamber via a second valve, and a mixing chamber having a second vent. The mixing chamber is in gaseous communication with the anode chamber via a third valve and receives fuel from the fuel chamber through a fuel valve, liquid from the liquid chamber via a liquid valve, and liquid effluent from the anode chamber via a liquid effluent valve. The mixing chamber also provides a fuel mixture to the anode chamber via a fuel mixture valve. Using effluent gases, the present invention drives fluids between elements of the fuel cell system.

38 Claims, 9 Drawing Sheets

METHODS AND APPARATUSES FOR A PRESSURE DRIVEN FUEL CELL SYSTEM

BACKGROUND OF THE INVENTION

1. Field of the Invention

The present invention is directed to methods and apparatuses for driving fluids in a fuel cell, and more particularly, to methods and apparatuses for moving fluids, specifically water, fuel, a fuel mixture and liquid effluent, in a direct methanol fuel cell system using self-generated pressure differentials.

2. Background of the Prior Art

Substantial research has been dedicated to development of direct oxidation fuel cell systems, including but not limited to direct methanol fuel cell systems for use in portable electronics in recent years. Those skilled in the art will recognize a direct oxidation fuel cell is one that does not require fuel to be processed following its introduction into the fuel cell system. For a direct methanol fuel cell system to operate properly, it is inperative that the fluids in the system are available to the fuel cell for the generation of electricity.

Currently, direct oxidation fuel cell systems, including direct methanol fuel cell systems (DMFC Systems) are typically operated in a particular physical orientation in order for the system to properly operate (e.g., fuel supply, water supply). However, because many potential applications for DMFC Systems are operated in a variety of orientations, it is imperative that the DMFC System be able to operate regardless of its orientation.

Previous methods of supplying fuel to a fuel cell have focused on directing the fuel with a pump or series of pumps, as shown in FIG. 1. Alternatively, pressurized fuel tanks or cartridges may be used to drive fuel into the system. However, pumps result in parasitic power loss, and fabrication of pressurized fuel tanks that will effectively deliver fuel to a direct methanol fuel cell (DMFC) is cost prohibitive and difficult. In addition, in a DMFC System that recirculates the unreacted methanol/water fuel mixture and adds neat methanol to provide adequate fuel to the system, it is necessary to ensure that the new methanol is evenly mixed in the mixture prior to introduction into the anode.

It is therefore desirable to have a fuel delivery and mixture maintaining system that does not require that a pump or other power consuming device be used to manage fluid flow and composition within the fuel cell system.

SUMMARY OF THE INVENTION

The present invention provides unique methods and apparatuses for driving fluids throughout a fuel cell system, and for mixing fuel and water into a fuel mixture using pressure differentials produced by an effluent gas. Thus, the present invention allows for the movement and mixing of fluids in a direct oxidation fuel cell system without the use of electrically driven pumps or other electrically driven apparatuses.

The present invention presents novel apparatuses and methods to utilize anodically generated $CO_2$ to maintain and provide a sufficient flow of methanol and water ultimately to the anode chamber of a fuel cell. It will be understood by those skilled in the art that the invention can be used with a variety of fuel cell configurations, including but not limited to configurations utilizing a bipolar stack, as well as those that use multiple Protonically Conductive Membranes assembled in a single plane, or single-cell Direct Methanol Fuel Cell System designs.

Accordingly, it is an object of the present invention to provide a means to ensure that a consistent supply of the fuel mixture is provided to an anode chamber of a fuel cell to enable electricity generating reactions to continue It is also an object of the present invention to provide orientation independence for a fuel cell system. That is, the present invention allows a fuel cell system to operate in any variety of orientations. In prior art direct oxidation fuel cell systems, the fuel cell is typically required to remain in a single position, so that gravity is used to aid in movement of liquids/gases in the system. Accordingly, the present invention allows for direct oxidation fuel cell systems to be used in portable electronics.

It is yet a further object of the present invention to provide a fuel cell system to ensure that proper amounts of the constituents that comprise the fuel mixture are supplied to a mixing chamber.

It is another object of the present invention to ensure that proper flow of the fuel mixture, liquid anode effluent comprised of unreacted fuel and water, added fuel and/or added water, occurs. Moreover, the present invention allows for the accelerated and enhanced mixing of "neat" methanol with— the liquid anode effluent and cathodically generated water.

In each of the embodiments of the invention, it is important to note that the fuel may be delivered to the system via a cartridge (similar to that used in a fountain pen) or through a tank that may be refilled. It should be further understood that the valves described in the present invention are preferably electrically actuated and allow the flow of fluid only when open, and preferably only in one direction.

Accordingly, in a first aspect of the present invention, a fuel cell system includes a housing defining an anode chamber and a cathode chamber and includes a catalyst, a protonically conductive (but electronically non-conductive) membrane positioned between the anode chamber and the cathode chamber and a first vent connecting said anode chamber with the ambient environment. The catalyst is preferably applied to the anode and cathode faces of the protonically conductive membrane. The system also includes a fuel chamber in gaseous communication with the anode chamber via a first valve, a water chamber in gaseous communication with the anode chamber via a second valve, and a mixing chamber having a second vent. The mixing chamber is in gaseous communication with the anode chamber via a third valve and receives fuel from the fuel chamber through a fuel valve, water from said water chamber via a water valve, and liquid effluent from the anode chamber via a liquid effluent valve. The mixing chamber also provides a fuel mixture to the anode chamber via a fuel mixture valve.

In yet another aspect of the present invention, a method for moving a liquid between chambers of a fuel cell system includes sealing off an anode chamber and a first chamber having a liquid stored therein of a fuel cell system from external pressure creating a closed sub-system, while allowing an effluent gas produced in the anode chamber to freely flow between the anode chamber and the first chamber, and storing a portion of said effluent gas in the first chamber. A first pressure of the sub-system increases due to an increasing volume of effluent gas being produced—in the anode chamber. The method also includes sealing off in the first chamber from the anode chamber, substantially ceasing the flow of the effluent gas between the anode chamber and the first chamber, creating a pressure differential between a second chamber and the first chamber by lowering a second pressure in the second chamber to a point below the first pressure, opening a conduit between the first chamber and the second chamber, where, as a result of the pressure differential, the liquid stored in the first chamber flows into the second chamber via the second conduit.

In the above aspect, the first and second chambers may be the following:

| First Chamber | Liquid | Second Chamber |
|---|---|---|
| mixing chamber | fuel mixture | anode chamber |
| water chamber | water | mixing chamber |
| fuel chamber | fuel | mixing chamber |
| anode chamber | liquid effluent | mixing chamber |

In yet another aspect of the present invention, a method for agitating a liquid stored in a first chamber of a fuel cell system includes sealing off the anode chamber from external pressure, storing an effluent gas produced in the anode chamber within the anode chamber, where pressure within the anode chamber increases over a period of time due to an increasing volume of effluent gas being produced. The method also includes creating a pressure differential between the first chamber and the anode chamber by lowering a first pressure of a first chamber to a point below the anode pressure, and opening a conduit between the anode chamber and the first chamber. As a result of the pressure differential, effluent gas stored in the anode chamber flows into the first chamber agitating the liquid stored there and is then vented to the ambient environment.

The following additional aspects of the present invention, working in conjunction with the fuel cell system described in the first aspect, are directed to methods for moving particular fluids between chambers of the fuel cell system, and are each set out below:

A method for moving a fuel and water mixture stored within the mixing chamber to the anode chamber. This method includes closing the first vent, the second vent, the first valve, the second valve, the fuel valve, the fuel mixture valve, the water valve, and the liquid effluent valve, establishing a closed sub-system between the anode chamber and the mixing chamber. The method also includes the steps of opening the third valve allowing an effluent gas produced in the anode chamber to freely flow between the anode chamber and the mixing chamber, and storing a portion of the effluent gas produced in the anode chamber in the mixing chamber. A volume of the effluent gas establishes a first pressure within the closed sub-system and the first pressure becomes increasingly higher as the effluent gas is produced. The method further includes the steps of closing the third valve to isolate the mixing chamber from the anode chamber, opening the first vent to release the first pressure in the anode chamber such that a second pressure is established within the anode chamber lower than the first pressure creating a pressure differential between the mixing chamber and the anode chamber, closing the first vent, and opening the fuel mixture valve and allowing the fuel mixture to flow from the mixing chamber into the anode chamber as a result of the pressure differential.

A method for moving water stored within the water chamber to the mixing chamber. The method includes closing the first vent, the second vent, the first valve, the third valve, the fuel valve, the fuel mixture valve, the water valve, and the liquid effluent valve, wherein a closed sub-system is established between the anode chamber and the water chamber. The method also includes the steps of opening the second valve allowing an effluent gas produced in the anode chamber to freely flow between the anode chamber and the water chamber, and storing a portion of the effluent gas produced in the anode chamber in the water chamber. A volume of the effluent gas establishes a first pressure within the closed sub-system, and the first pressure becomes increasingly higher as the effluent gas is produced. The second valve is then closed to isolate the water chamber from the anode chamber, and then the second vent is opened to lower a second pressure in the mixing chamber below the first pressure creating a pressure differential between the water chamber and the mixing chamber. The method further includes the steps of closing the second vent, opening the water valve and allowing water to flow from the water chamber into the mixing chamber as a result of the pressure differential.

A method for moving fuel stored within the fuel chamber to the mixing chamber includes closing the first vent, the second vent, the second valve, the third valve, the fuel valve, the fuel mixture valve, the water valve, and the liquid effluent valve, establishing a closed sub-system between the anode chamber and the water chamber, opening the first valve allowing an effluent gas produced in the anode chamber to freely flow between the anode chamber and the fuel chamber and storing a portion of the effluent gas produced in the anode chamber in the fuel chamber. A volume of the effluent gas establishes a first pressure within the closed sub-system which becomes increasingly higher as the effluent gas is produced. The method further includes the steps of closing the first valve to isolate the fuel chamber from the anode chamber, opening the second vent to lower a second pressure below the first pressure, creating a pressure differential between the fuel chamber and the mixing chamber, closing the second vent, opening the fuel valve and allowing fuel to flow from the fuel chamber into the mixing chamber as a result of the pressure differential.

A method for moving liquid effluent from the anode chamber to the mixing chamber includes closing the first vent, the second vent, the first valve, the second valve, the third valve, the fuel valve, the fuel mixture valve, the water valve, and the liquid effluent valve establishing a closed sub-system between the anode chamber and the liquid chamber, and storing an effluent gas produced in the anode chamber in the anode chamber. A volume of the effluent gas establishes a first pressure within the anode chamber that becomes increasingly higher as the effluent gas is produced. The method further includes opening the second vent and the effluent valve allowing an effluent liquid stored in the anode chamber to flow from the anode chamber into the mixing chamber as a result of the pressure differential.

A method for agitating a fuel mixture stored within the mixing chamber includes closing the first vent, the second vent, the first valve, the second valve, the third valve, the fuel valve, the fuel mixture valve, the water valve, and the liquid effluent valve, wherein a closed sub-system is established between the anode chamber and the water chamber, and storing an effluent gas produced in the anode chamber in the anode chamber. A volume of the effluent gas establishes a first pressure within the anode chamber that becomes increasingly higher as the effluent gas is produced. The method further includes the steps of opening the second vent and the third valve allowing the stored effluent gas to flow from the anode chamber into the mixing chamber and out the second vent, where the fuel mixture stored in the mixing chamber is agitated as a result of the effluent gas flowing into the mixing chamber and out of the second vent as a result of the pressure differential.

In the preceding aspects, pressure may be lowered in a particular chamber by venting the respective chamber to an environment having a lower pressure. Thus, such an environment may include ambient air pressure.

In yet another aspect of the present invention, a fuel cell system similar to the first aspect includes a pump in place of the mixing chamber. Effluent gas is used to move fuel from the fuel chamber to the pump. Thus, this aspect includes a housing defining an anode chamber and a cathode chamber and including a catalyst and a protonically conductive, but electronically non-conductive, membrane positioned between the anode chamber and the cathode chamber where the anode chamber includes a first vent, a fuel chamber in gaseous communication with the anode chamber via a first valve, a water chamber, and a pump. The pump receives fuel from the fuel chamber via a fuel valve, water from the water chamber, and liquid effluent from the anode chamber. The pump provides a fuel mixture to the anode chamber.

In yet a further aspect of the present invention, the above fuel cell system is used with a method for supplying fuel to the pump and includes closing the fuel valve, opening the first valve allowing an effluent gas produced in the anode chamber to freely flow between the anode chamber and the fuel chamber, establishing a closed sub-system between the anode chamber and the fuel chamber, and storing a portion of said effluent gas produced in the anode chamber in the fuel chamber. A volume of the effluent gas establishes a first pressure within the closed sub-system, with the first pressure becoming increasingly higher as the effluent gas is produced and the first pressure is higher than a second pressure of the pump establishing a pressure differential there between. The method also includes closing the first valve to isolate the fuel chamber from the anode chamber, opening the fuel valve and allowing fuel to flow from the fuel chamber into the pump as a result of the pressure differential.

In yet a further aspect of the present invention, a fuel cell system includes a housing defining an anode chamber and a cathode chamber and including a catalyst, a protonically conductive but electronically non-conductive membrane positioned between the anode chamber and the cathode chamber and a first vent, a first conduit having a first end for receiving liquid effluent from the anode chamber and a second end for supplying a fuel mixture comprised of fuel and/or water, and the liquid effluent to the anode chamber, and a fuel chamber in gaseous communication with the anode chamber via a first valve and in communication with the first conduit via a fuel valve. The water chamber may also be in communication with the cathode chamber to receive cathodically generated water within the cathode chamber.

In yet another aspect of the present invention, a method for controlling a concentration of fuel in a fuel-water mixture for a direct oxidation fuel cell system includes determining a first concentration level of fuel in a fuel-water mixture of an anode chamber of a direct oxidation fuel cell system and comparing the first concentration level to a second required concentration level required for a particular operating condition. Fuel is added to the fuel-water mixture when the first concentration level is less than the second required concentration level, under given operating conditions and water is added to the fuel-water mixture when the first concentration level is higher than the second required concentration level under given operating conditions.

In a related aspect, a system for performing this method includes a housing defining an anode chamber and a cathode chamber, with the housing also including a catalyst and a protonically conductive but electronically non-conductive membrane and the anode chamber including a fuel-water mixture. The system also includes a fuel concentration sensor for determining a first concentration level of fuel in said fuel-water mixture, a fuel chamber for storage of fuel, where the fuel chamber is in communication with the liquid-fuel mixture, a water chamber for storage of water, where the water chamber is in communication with the fuel-water mixture, and a controller for controlling a first flow of fuel to the fuel-water mixture, for controlling a second flow of water to the fuel-water mixture, and including a memory having a look-up table stored therein. The look-up table includes operating condition data and associated fuel concentration levels.

For a better understanding of the above aspects of the invention, reference is made to the below referenced drawings and written description following immediately thereafter

DESCRIPTION OF THE PREFERRED EMBODIMENTS

First Embodiment

Figure 1:
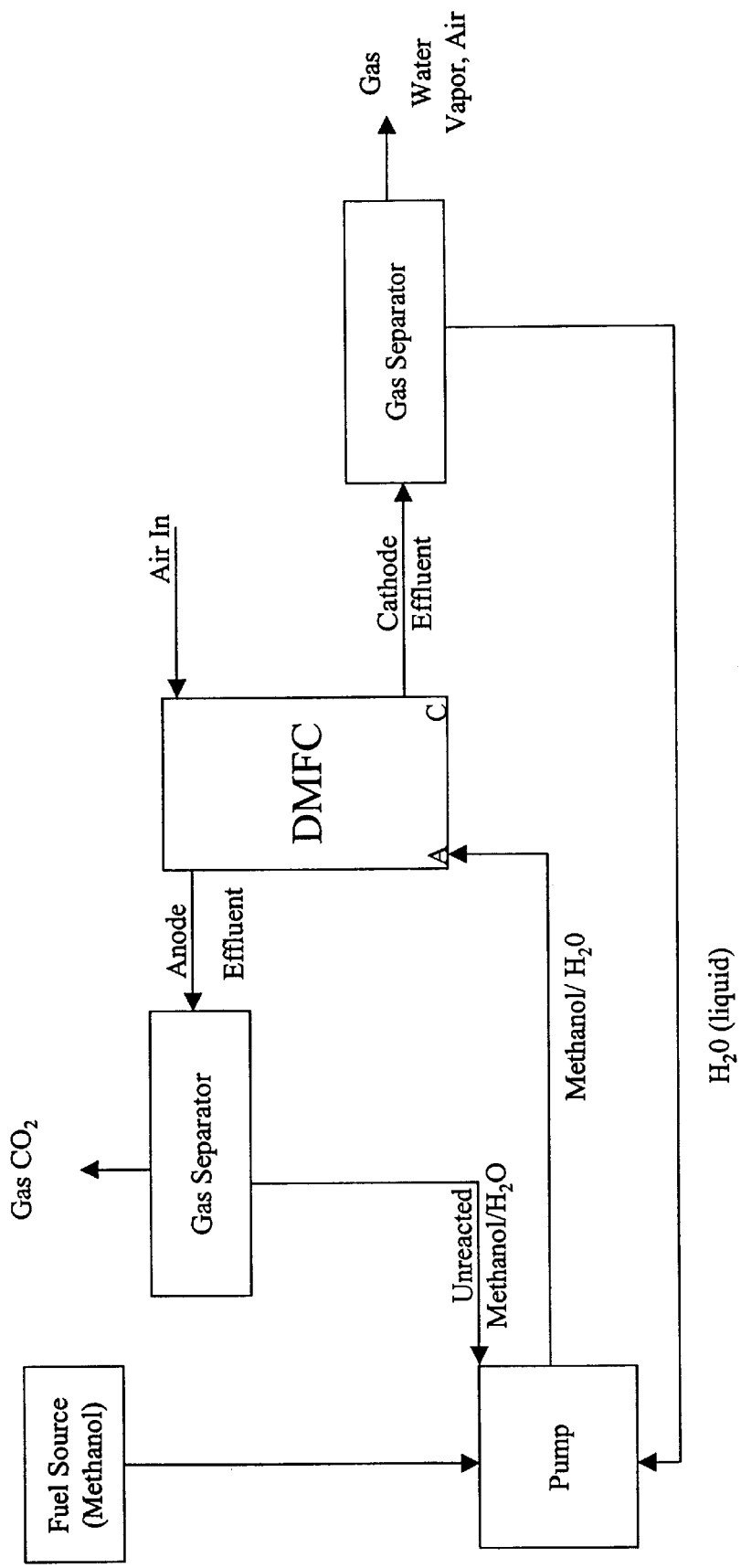
FIG. 1 illustrates a schematic of a prior art fuel cell system using a pump to supply a fuel mixture to an anode chamber of a fuel cell system.
Figure 2:
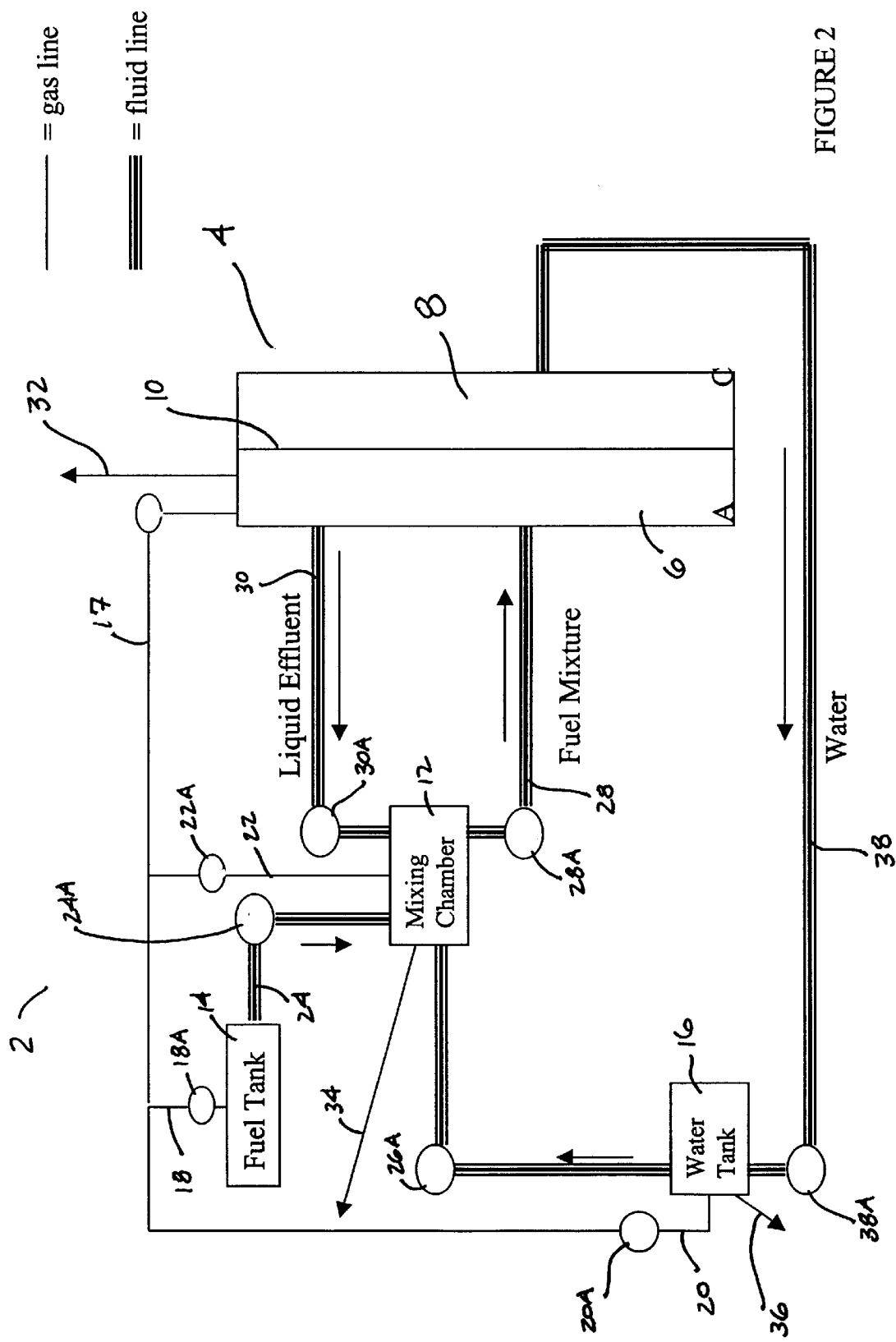
FIG. 2 illustrates a schematic of a fuel cell system where an effluent gas is used to fully drive liquids throughout the system according to an embodiment of the present invention.

As shown in FIG. 2, a direct methanol fuel cell system 2 includes a housing 4 defining an anode chamber 6 and a cathode chamber 8, a protonically conductive 10 but electronically non-conductive membrane (Protonically Conductive Membrane) and a catalyst, a mixing chamber 12, a fuel tank 14, and a water tank 16. The catalyst may be positioned anywhere within the anode and cathode chambers, but preferably is applied to one or both faces of the Protonically Conductive Membrane.

Gas carrying conduits connect the anode chamber (via conduit 17) to each of the fuel tank (via conduit 18), the water tank (via conduit 20), and the mixing chamber (via conduit 22). The gas carrying conduits ferry anodically generated gaseous effluent, $CO_2$ in a DMFC System, from the anode chamber to one or more of the other elements of the fuel cell. Each conduit also includes a valve to control the flow within a particular conduit. Thus, gas conduit 17 includes valve 17A, gas conduit 18 includes valve 18A, gas conduit 20 includes valve 20A, and gas conduit 22 includes valve 22A. In each embodiment of the invention, a gas separator (not shown) may be incorporated using methods well known in the art. Liquid-carrying conduits carry fuel and water from the fuel tank (via conduit 24) and the water tank (via conduit 26), respectively, to the mixing chamber. Additional liquid conduits ferry fuel mixture from the mixing chamber (via conduit 28) to the anode chamber, and liquid effluent (un-reacted methanol and water) from the anode chamber to the mixing chamber.

Each of the liquid carrying conduits also includes a valve to control the flow therein. Accordingly, conduit 24 includes valve 24A, conduit 26 includes valve 26A, conduit 28 includes valve 28A, and conduit 30 includes valve 30A.

The anode chamber, the mixing chamber and the water tank are each equipped with a vent to the external environment, which can be opened to allow the pressure within each to be equalized with the ambient environment.

In the first embodiment, fluids contained in respective chambers can be driven to another chamber or stirred, via a pressure differential developed between the chamber providing the fluid and the chamber receiving the fluid. Specifically, using $CO_2$ gas produced as a result of the anodic oxidation of the methanol fuel mixture in the anode chamber, pressure can be increased in the providing chamber above the pressure in the receiving chamber. The fluid carrying conduit between the two chambers includes a valve which is opened at an appropriate time to drive liquid from the providing chamber to the receiving chamber, once the pressure has reached a predetermined level.

Accordingly, through the select opening and closing of respective valves among the elements and chambers of the fuel cell system according to the first embodiment of the present invention, in a predetermined sequence, controlled flow of the fluid between elements is established.

For example, fluid may be moved to the anode chamber either directly (from the mixing chamber) or from the fuel and water tanks through the mixing chamber. In addition, unreacted methanol and water effluent from the anode chamber may be moved from the anode chamber to the mixing chamber through the coordinated opening and closing of the valves. A variety of functions may thus be performed using this system.

The following are examples of different functions that may be performed using the fuel cell system according to the present invention. Each example specifies the function, actions, and valve positions to carry our the particular function.

Each of the following functions occurs during operation of the fuel cell. Specifically, an electrical load (not shown) is placed electrically between the anode chamber and cathode chamber of the fuel cell, thereby establishing a path for electrons produced in the anode chamber to be transported to the cathode chamber. Accordingly, in an initial state of the fuel cell, prior to closing the circuit and connecting the load to the fuel cell, the anode chamber includes an initial supply of an appropriate amount of fuel mixture and effluents have not yet been produced.

One skilled in the art will appreciate that although the description for this embodiment includes a first valve 17A (and associated valve positions) located along the gas carrying conduit 17 adjacent the anode chamber, it is not necessary. The operation of gas valves located adjacent the other elements render this first valve redundant, but conceptually allows for more efficient pressure capture and venting within the system.

Function 1: Add fuel mixture to anode chamber

A pressure differential between the mixing chamber and the anode chamber is established by creating a closed sub-system comprising the anode chamber, the mixing chamber, and the gas carrying conduit connecting them. $CO_2$ generated in the anode chamber increases and produces a corresponding increase in pressure in the sub-system. Accordingly, the sub-system is established using the following valve positions:

| Valve Positions: | Valve | Status |
|---|---|---|
| | 17A | Open |
| | 18A | Closed |
| | 20A | Closed |
| | 22A | Open |
| | 24A | Closed |
| | 26A | Closed |
| | 28A | Closed |
| | 30A | Closed |
| | 38A | Closed |

Since the anode chamber and the mixing chamber are at the same pressure, above an initial pressure (which is generally ambient, atmospheric pressure), the two chambers must be isolated from one another and the pressure in the anode chamber lowered to produce the required pressure differential between the two chambers. Accordingly, valves are positioned in the following manner:

| Valve Positions: | Valve | Status |
|---|---|---|
| | 17A | Closed |
| | 18A | Closed |
| | 20A | Closed |
| | 22A | Closed |
| | 24A | Closed |
| | 26A | Closed |
| | 28A | Closed |
| | 30A | Closed |
| | 38A | Closed |

The anode vent is then opened to equalize the pressure therein with ambient pressure. Thus, since the mixing chamber remains at the higher pressure, a pressure differential between the two chambers is established.

Thus, to move the fluid in the mixing chamber to the anode chamber, the valves are positioned in the following manner:

| Valve Positions: | Valve | Status |
|---|---|---|
| | 17A | Closed* |
| | 18A | Closed |
| | 20A | Closed |

-continued

| Valve Positions: | Valve | Status |
|---|---|---|
| | 22A | Closed* |
| | 24A | Closed |
| | 26A | Closed |
| | 28A | Open |
| | 30A | Closed |
| | 38A | Closed |

*Valves may remain open, but are preferably closed

The anode vent may be thereafter closed, or may remain open during the fluid transfer. However, for a next pressure driven function to occur, the anode vent must be closed so that the $CO_2$ gas may be efficiently used to create a required pressure differential between the chambers where the fluid transfer will take place.

Function 2: Add water to mixing chamber

A pressure differential between the water chamber and the mixing chamber is established by creating a closed sub-system comprising the anode chamber, the water chamber, and the gas carrying conduit connecting them. $CO_2$ generated in the anode chamber increases and produces a corresponding increase in pressure in the sub-system. Accordingly, the sub-system is established using the following valve positions:

| Valve Positions: | Valve | Status |
|---|---|---|
| | 17A | Open |
| | 18A | Closed |
| | 20A | Open |
| | 22A | Closed |
| | 24A | Closed |
| | 26A | Closed |
| | 28A | Closed |
| | 30A | Closed |
| | 38A | Closed |

In order to insure that there is a pressure differential between the water chamber and the mixing chamber, the vent in the mixing chamber is opened to equalize the mixing chamber pressure with ambient pressure. Thereafter, the valves are positioned in the following manner:

| Valve Positions: | Valve | Status |
|---|---|---|
| | 17A | Closed |
| | 18A | Closed |
| | 20A | Closed |
| | 22A | Closed |
| | 24A | Closed |
| | 26A | Closed |
| | 28A | Closed |
| | 30A | Closed |
| | 38A | Closed |

Since the water chamber is at a pressure higher than ambient, it is also therefore higher than the pressure in the mixing chamber thereby establishing the pressure differential between the two chambers.

Thus, to move water from the water chamber to the mixing chamber, the mixing chamber vent is closed and the valves are positioned in the following manner:

| Valve Positions: | Valve | Status |
|---|---|---|
| | 17A | Closed* |
| | 18A | Closed |
| | 20A | Closed* |
| | 22A | Closed |
| | 24A | Closed |
| | 26A | Open |
| | 28A | Closed |
| | 30A | Closed |
| | 38A | Closed |

*Valves may remain open, but are preferably closed.

The anode vent may be open after valve 20A has been closed, or may remain closed. For a next pressure driven function to occur, however, the anode vent must be closed so that the $CO_2$ gas may be efficiently used to create a required pressure differential between the chambers where the fluid transfer will take place.

Function 3: Add fuel to mixing chamber.

A pressure differential between the fuel chamber and the mixing chamber is established by creating a closed sub-system comprising the anode chamber, the fuel chamber, and the gas carrying conduit connecting them. $CO_2$ generated in the anode chamber increases and produces a corresponding increase in pressure in the sub-system. Accordingly, the sub-system is established using the following valve positions

| Valve Positions: | Valve | Status |
|---|---|---|
| | 17A | Open |
| | 18A | Open |
| | 20A | Closed |
| | 22A | Closed |
| | 24A | Closed |
| | 26A | Closed |
| | 28A | Closed |
| | 30A | Closed |
| | 38A | Closed |

In order to insure that there is a pressure differential between the water chamber and the mixing chamber, the vent in the mixing chamber is opened to equalize the mixing chamber pressure with ambient pressure. Thereafter, the valves are positioned in the following manner:

| Valve Positions: | Valve | Status |
|---|---|---|
| | 17A | Closed |
| | 18A | Closed |
| | 20A | Closed |
| | 22A | Closed |
| | 24A | Closed |
| | 26A | Closed |
| | 28A | Closed |
| | 30A | Closed |
| | 38A | Closed |

Since the fuel chamber is at a pressure higher than ambient, it is also therefore higher than the pressure in the mixing chamber thereby establishing the pressure differential between the two chambers.

Thus, to move fuel from the fuel chamber to the mixing chamber, the mixing chamber vent is closed and the valves are positioned in the following manner:

| Valve Positions: | Valve | Status |
|---|---|---|
| | 17A | Closed* |
| | 18A | Closed* |
| | 20A | Closed |
| | 22A | Closed |
| | 30A | Closed |
| | 24A | Open |
| | 26A | Closed |
| | 28A | Open |
| | 38A | Closed |

Valves may remain open, but are preferably closed.

The anode vent may be open after valve 18A has been closed, or may remain closed. For a next pressure driven function to occur, however, the anode vent must be closed so that the $CO_2$ gas may be efficiently used to create a required pressure differential between the chambers where the fluid transfer will take place.

Function 4: Move liquid effluent from anode chamber to mixing chamber.

A pressure differential between the anode chamber and the mixing chamber is established by isolating the anode chamber from the remainder of the system. $CO_2$ generated in the anode chamber increases and produces a corresponding increase in pressure. Accordingly, the anode vent is closed and the valves are placed in the following positions:

| Valve Positions: | Valve | Status |
|---|---|---|
| | 17A | Closed |
| | 18A | Closed |
| | 20A | Closed |
| | 22A | Closed |
| | 30A | Closed |
| | 24A | Closed |
| | 26A | Closed |
| | 28A | Closed |
| | 38A | Closed |

In order to insure that there is a pressure differential between the anode chamber and the mixing chamber, the vent in the mixing chamber is opened to equalize the mixing chamber pressure with ambient pressure. Thereafter, the valves are positioned in the following manner to send liquid effluent to the mixing chamber from the anode chamber:

| Valve Positions: | Valve | Status |
|---|---|---|
| | 17A | Closed |
| | 18A | Closed |
| | 20A | Closed |
| | 22A | Closed |
| | 24A | Closed |
| | 26A | Closed |
| | 28A | Closed |
| | 30A | Open |
| | 38A | Closed |

Thereafter, the $CO_2$ generated in the anode chamber may be vented to the ambient environment, or used to create pressure differentials within the fuel cell system.

Function 5: Stir fuel mixture in the mixing chamber.

A pressure differential between the anode chamber and the mixing chamber is established by isolating the anode chamber from the remainder of the system. $CO_2$ generated in the anode chamber increases and produces a corresponding increase in pressure. Accordingly, the anode vent is closed and the valves are placed in the following positions:

| Valve Positions: | Valve | Status |
|---|---|---|
| | 17A | Closed |
| | 18A | Closed |
| | 20A | Closed |
| | 22A | Closed |
| | 24A | Closed |
| | 26A | Closed |
| | 28A | Closed |
| | 30A | Closed |
| | 38A | Closed |

In order to insure that there is a pressure differential between the anode chamber and the mixing chamber, the vent in the mixing chamber is opened to equalize the mixing chamber pressure with ambient pressure. Thereafter, the valves are positioned in the following manner to send CO2 flowing through the mixing chamber from the anode chamber to the mixing chamber in order to agitate the fuel-water mixture:

| Valve Positions: | Valve | Status |
|---|---|---|
| | 17A | Open |
| | 18A | Closed |
| | 20A | Closed |
| | 22A | Open |
| | 24A | Closed |
| | 26A | Closed |
| | 28A | Closed |
| | 30A | Closed |
| | 38A | Closed |

It will be understood to those skilled in the art that it may require more than one actuation to properly mix the fuel-water mixture.

Water generated on the cathode may be moved from the cathode to the water tank via a wicking agent, and/or by other systems including use of the system described in associated U.S. application Ser. No. 09/818,290, filed Mar. 27, 2001, entitled, METHODS AND APPARATUSES FOR MANAGING EFFLUENT PRODUCTS IN A DIRECT CONVERSION FUEL CELL SYSTEM (which is commonly owned by the assignee of the present invention) the entire application of which is incorporated by reference. Water generated on the cathode may also be removed to the water tank by other means known to those skilled in the art, including but not limited to gravity based systems.

Figure 7:
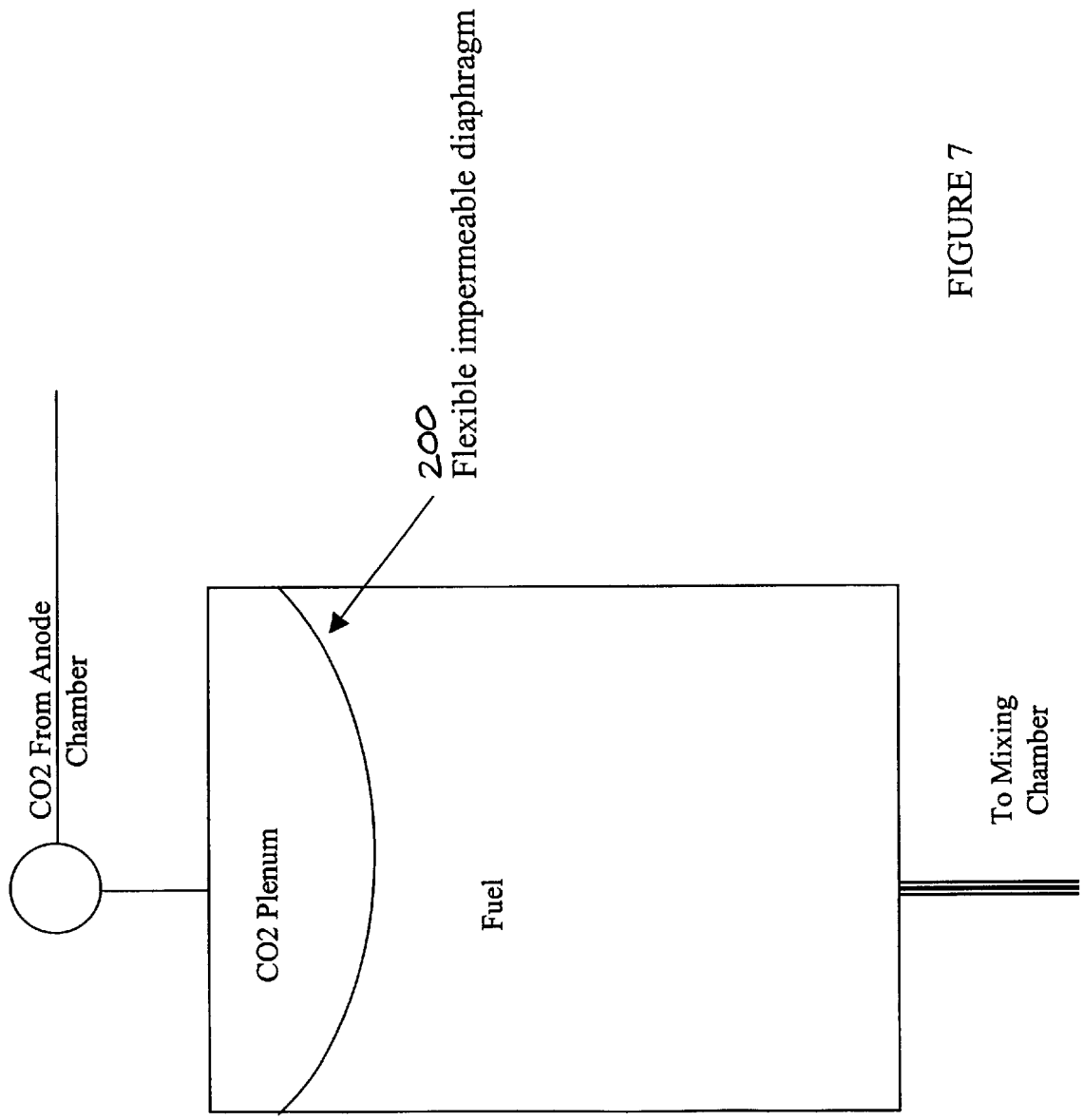
FIG. 7 illustrates a schematic of a fuel cell according to another embodiment of the present invention.

While it is preferable to implement this embodiment of the present invention using only valves to control the flow of $CO_2$, a flexible impermeable membrane 200 (FIG. 7) may also be used to prevent the $CO_2$ from mixing with the various liquids and bubbling out before creating the necessary pressure differential.

The valves of the present invention may be electrically or mechanically actuated and may be fabricated using a variety of designs well known to those skilled in the art. Moreover, the fluid valves are preferably metering valves that may be used to control the amount of fluid that is released when actuated.

To coordinate the opening and closing of the valves, a computer processor and associated supporting and peripheral systems may be used and programmed to actuate the valves according to the above functions.

Second Embodiment

Figure 3:
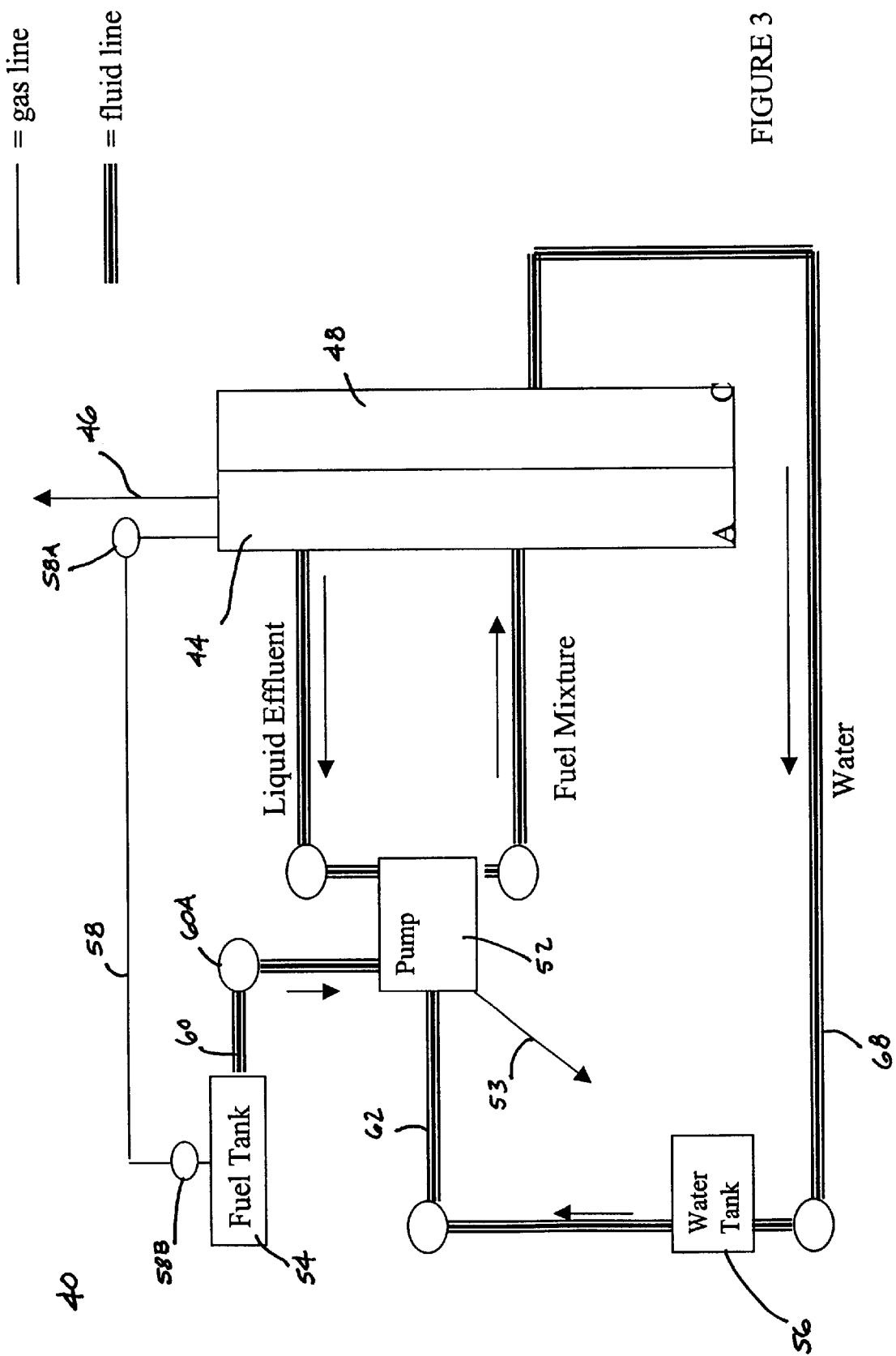
FIG. 3 illustrates a schematic of a fuel cell system where an effluent gas produced in the anode chamber is used to partially drive liquids in the fuel cell according to an embodiment of the present invention.

FIG. 3 illustrates a second embodiment according to the present invention. Here, a direct methanol fuel cell system includes a housing 42 defining an anode chamber 44 having a vent 46 and a cathode chamber 48. The system includes a protonically conductive but electronically non-conductive membrane 50 (Protonically Conductive Membrane), a catalyst, a pump 52, a fuel tank 54, and a water tank 56. As in the previous embodiment, the catalyst may be positioned anywhere within the anode and cathode chambers, but preferably is applied to one or both sides of the Protonically Conductive Membrane 50.

It should be understood that the pump includes, but is not limited to, a passively driven pump as disclosed in U.S. patent application Ser. No. 09/717,754, filed Dec. 8, 2000, entitled PASSIVELY PUMPED LIQUID FEED FUEL CELL SYSTEM, which is commonly owned by the assignee of the present invention, and which is incorporated by reference herein in its entirety. A gas carrying conduit 58 connect the anode chamber to the fuel tank. Liquid-carrying conduits carry fuel and water from the fuel tank and the water tank via conduits 60 and 62, respectively, to the pump, fuel mixture from the pump to anode chamber via conduit 64, and liquid effluent from the anode chamber to the pump via conduit 66. An additional liquid conduit 68 may be included which transports liquid effluent from the cathode chamber to the water tank. A valve 60A controls the flow from the fuel tank to the pump.

Similar to functions performed by the valves according to the first invention, this embodiment utilizes $CO_2$ produced in the anode chamber to create a pressure differential between the fuel tank and a pump, so that when the fuel mixture is too lean (i.e., not enough fuel in the water/fuel mixture), fuel may be driven to the pump.

The pump operates to force a fuel mixture into the anode chamber and for drawing liquid effluent from the anode chamber. A vent positioned on the pump allows for pressure within the pump to be equalized with ambient pressure, to insure that an adequate pressure differential between the fuel tank and the pump is created.

Accordingly, pressure is increased in the fuel tank by closing the anode vent 46, opening valves 58A and 58B, and closing valve 60A. A pump vent 53 is opened to insure that the pressure therein is at a lower pressure, i.e., ambient pressure, than that of the fuel tank.

When the pressure of the fuel tank reaches an appropriate level to drive fuel into the pump, and the pump requires the addition of fuel, valves 58A and 58B are closed (although either one or both may remain open), the anode vent 46 is opened, the pump vent 53 is closed, and valve 60A is opened. Fuel is then driven by the pressure differential to the pump.

Third Embodiment

The fuel cell according to the fourth embodiment of the present invention is substantially similar to the DMFCs described in the first and second embodiments, except in place of the mixing chamber, a recirculation conduit 69 is included. Specifically, liquid effluent from the anode chamber 70 is circulated through the conduit from one end of the anode chamber to the other end. The fuel tank 72 provides fuel to the recirculation conduit through a conduit 74 and 74A fuel valve. Similarly, the water tank supplies water to the recirculation conduit through a conduit 80 and 80A water valve.

Accordingly, fuel and water are provided into the recirculation conduit as they are needed, so that the fuel concentration in the fuel mixture remains at a predetermined amount, or may be adjusted as necessary. Thus a gas conduit 84 delivers effluent gas from the anode chamber 70 to each of the fuel tank 72 and water tank 78 via conduit 71 and associated valve 71A and conduit 77 and associated valve 77A, respectively. Effluent from the cathode chamber 75 may be delivered to the water tank 78 via liquid conduit 79 and valve 79A.

To move fuel to the recirculation conduit, an anode vent 73 is closed, valves 84A and 71A are opened, and valves 77A, 74A, 80A and 79A are closed. The increasing volume of $CO_2$ produced in the anode chamber increases the pressure of the anode chamber/fuel tank. When a this pressure reaches a predetermined level, and the fuel mixture requires more fuel, valves 84A and/or 71A are then closed and the anode vent is opened to equalize the pressure therein to ambient pressure, thereby establishing a pressure differential between the fuel tank and the recirculation conduit/anode chamber. Thereafter, the anode vent is closed and valve 74A is opened. The pressure differential drives the fuel from the fuel tank and into the recirculation conduit.

The same process is used to deliver water to the fuel mixture. The anode vent 73 is closed, valves 84A and 77A are opened, and valves 71A, 74A, 80A and 79A are closed. After the pressure in the anode chamber/water chamber reaches a predetermined amount, and the fuel mixture requires more water, valves 84A and/or 77A are closed and the anode vent is opened. Opening the anode vent, of course, equalizes the pressure therein to ambient, creating the necessary pressure differential between the water tank and the anode chamber. The anode vent is then closed, and valve 80A is opened, driving water into the fuel mixture.

Fourth Embodiment

Figure 4:
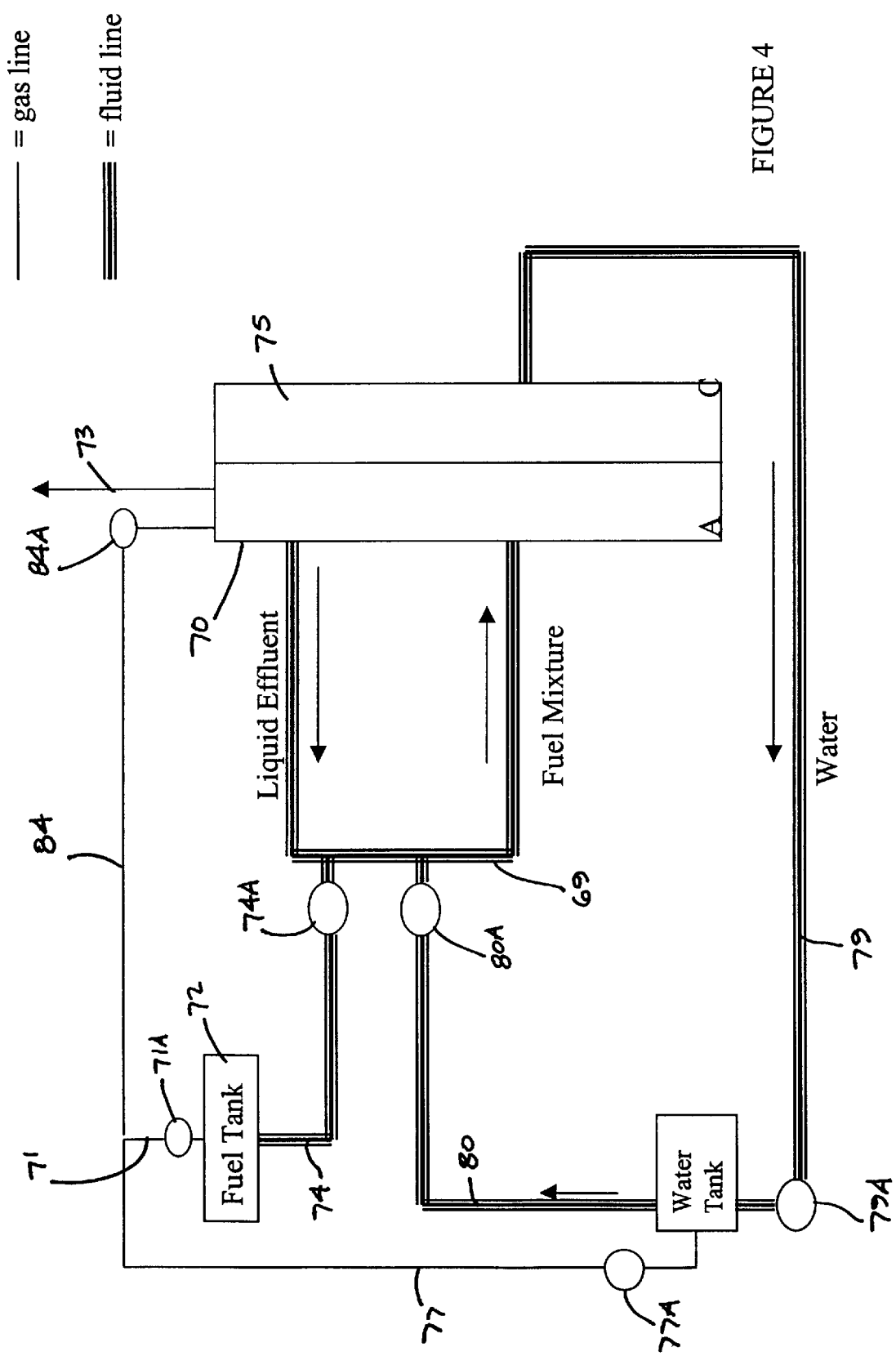
FIG. 4 illustrates a schematic of a fuel cell system according to another embodiment of the present invention.
Figure 5:
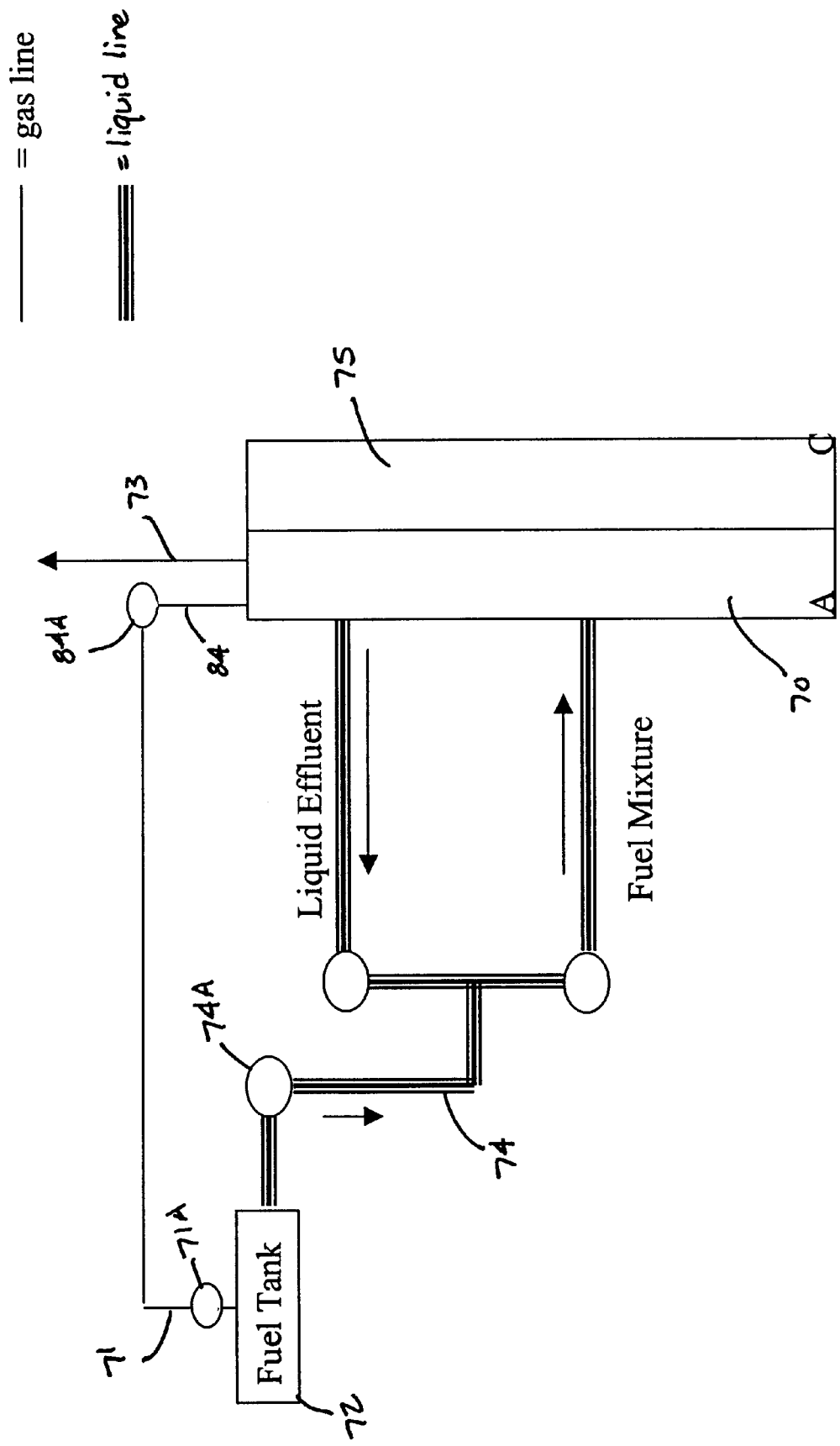
FIG. 5 illustrates a schematic of a fuel cell according to another embodiment of the present invention.

FIG. 5 illustrates a similar design to that of FIG. 4, except in this case, the system does not include a water tank and associated conduits and valves. To drive fuel into the recirculation conduit, the procedure described in association with FIG. 4 is followed. Additional water, if necessary, may be provided from the cathode chamber to maintain the proper fuel-water mixture.

Fifth Embodiment

Figure 6:
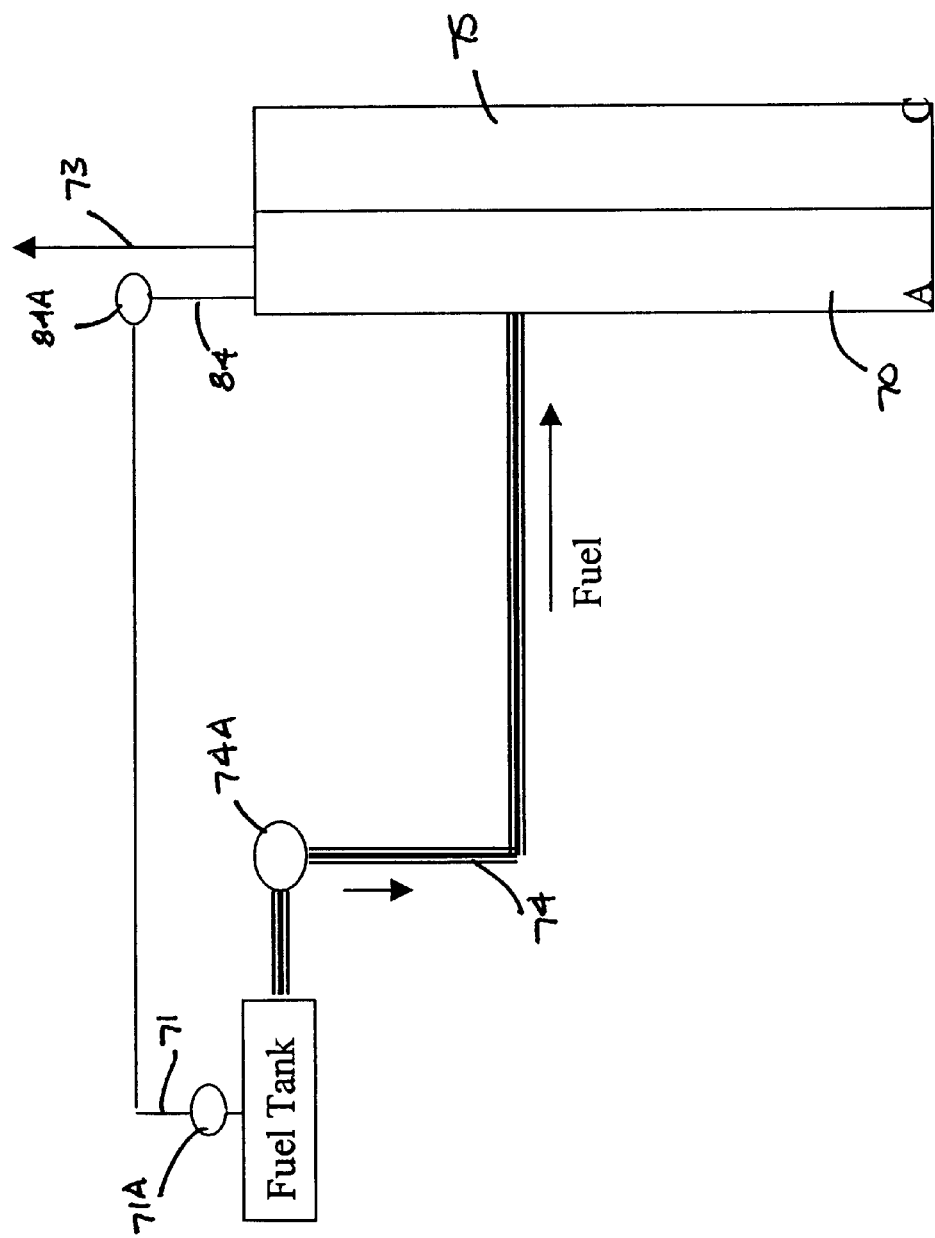
FIG. 6 illustrates a schematic of a fuel cell according to another embodiment of the present invention.

FIG. 6 illustrates yet another alternative design to that of FIGS. 4 and 5. Specifically, in this embodiment, fuel is supplied directly into the anode chamber without being diluted, being driven in the same procedure as that described in association with the third and fourth embodiments.

Sixth Embodiment

Figure 8:
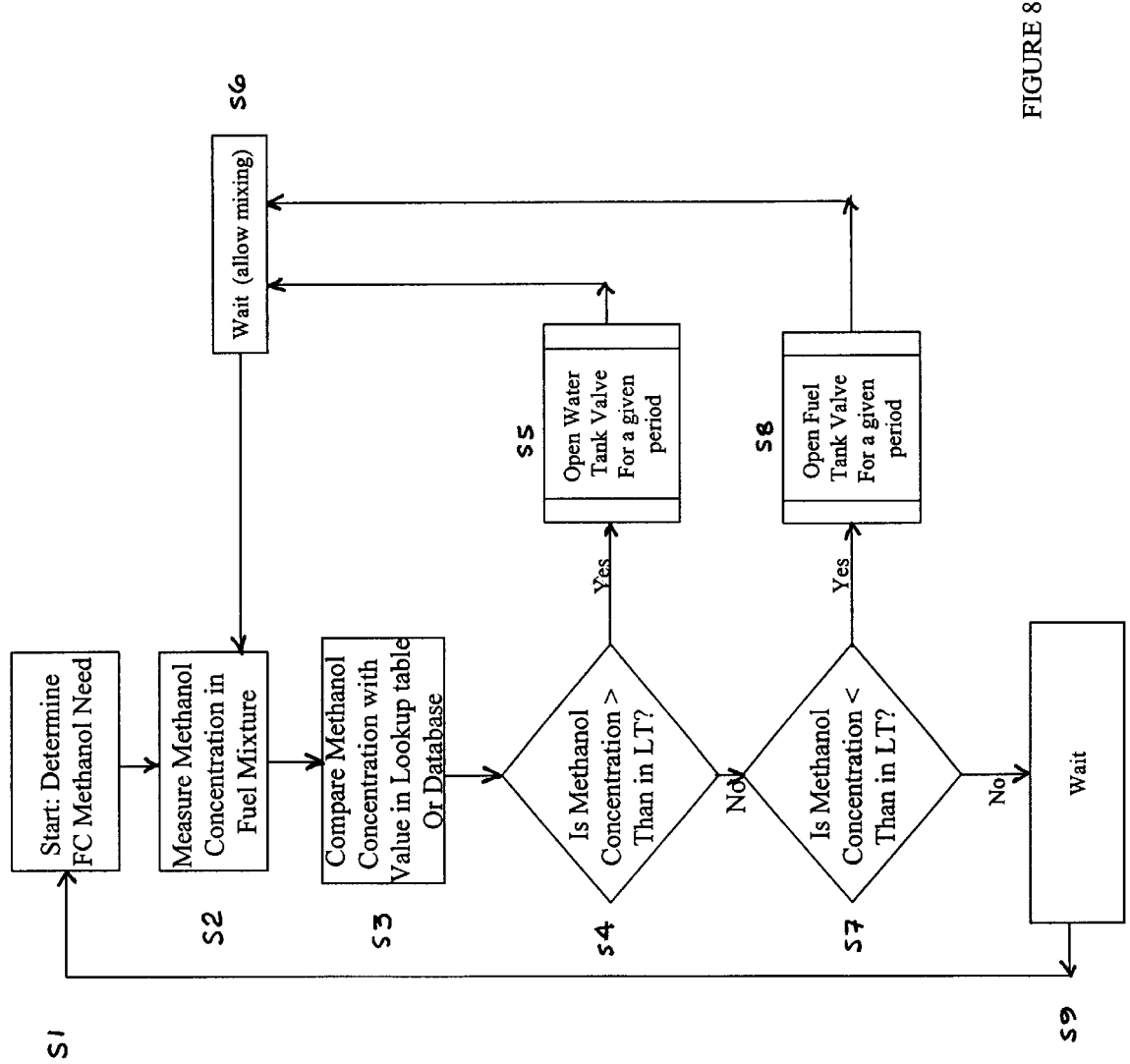
FIG. 8 illustrates a flexible impermeable diaphragm used with the embodiments of the presents a schematic of a fuel cell according to another embodiment of the present invention.

FIG. 8 illustrates the sixth embodiment according to the present invention relating to a method and system for determining an appropriate level of fuel in a fuel mixture for a DMFC. This system will be described with reference to the system illustrated in FIG. 2.

Figure 9:
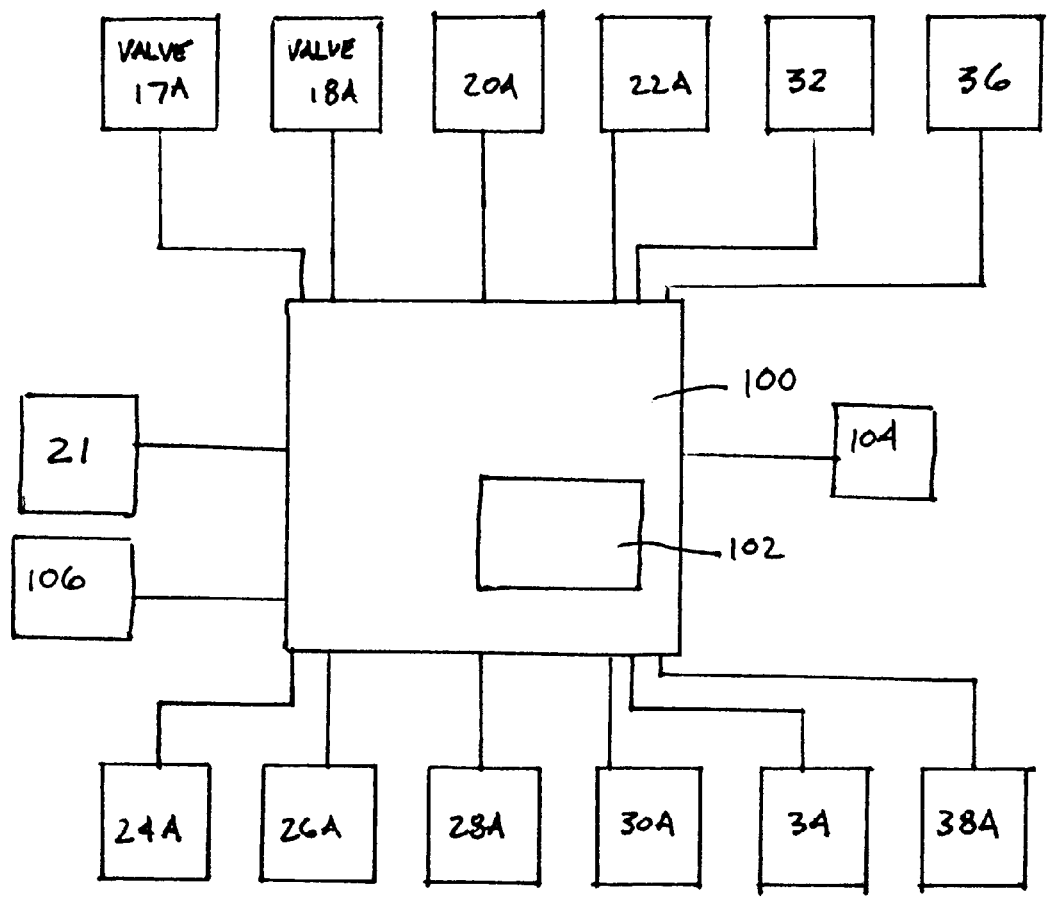
FIG. 9 illustrates a schematic view of a controller for controlling the opening and closing of the valves of the fuel cell system according to the present invention.

A fuel concentration sensor 21 (FIG. 9) located within the system is used to determine a first concentration level of fuel in the fuel mixture. The fuel tank and the water tank supplies fuel and water, respectively, to the fuel mixture using the methods according to the previous embodiments. The fuel cell system, and specifically the gaseous and liquid valves, and vents are operated and controlled via a controller 100 as shown in FIG. 9. FIG. 9 illustrates the controller in communication with each one of the valves and vents of the fuel cell system. The controller also includes a memory 102 containing a look-up table having data associated with fuel levels in the fuel mixture for specific operating parameters. A clock/timer 106 is used to measure time between obtaining fuel concentration levels. Alternatively, an electrical meter or other device which measures the electrical output of the fuel cell system may be used to determine when to re-measure the fuel concentration level. As shown in FIG. 8, the system monitors the fuel level in the fuel mixture as well as the electricity that is being required of the system using a metering device 104. Accordingly, the system obtains the current fuel concentration compares (step S1) and it with a fuel level required for a particular condition using the look-up table (step S2). If the fuel mixture is too lean, requiring more fuel from the fuel tank, the system opens/closes the appropriate vents and valves to drive fuel into the fuel mixture (steps S7, S8). If the fuel mixture is too rich, requiring more water from the water tank, the system responses appropriately (steps S4, S5).

Each time fuel or water is added, a period of time is pre-programmed to elapse so that the component can adequately mix with the pre-existing mixture (step S6). Otherwise, the fuel level sensor might obtain a false reading and supply fuel or water to the system at an inappropriate time. This would eventually lead to inefficient operation of the DMFC, potentially resulting in failure of the fuel cell system.

One skilled in the art will appreciate that the controller of FIG. 9 and the method outlined in FIG. 8 may be used with any of the above-described embodiments of the invention. For simplicity, the controller was illustrated in communication with the valves and vents as shown in FIG. 2.

Having thus presented the present invention in view of the above described embodiments, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed:

1. A fuel cell system comprising:
    a housing defining an anode chamber and a cathode chamber and including a catalyst, a protonically conductive but electronically non-conductive membrane positioned between said anode chamber and said cathode chamber and a first vent in said anode chamber;
    a fuel chamber in gaseous communication with said anode chamber via a first valve;
    a water chamber in gaseous communication with said anode chamber via a second valve; and
    a mixing chamber having a second vent, wherein said mixing chamber is in gaseous communication with said anode chamber via a third valve, wherein
        said mixing chamber receives fuel from said fuel chamber through a fuel valve, water from said water chamber via a water valve, and liquid effluent from said anode chamber via a liquid effluent valve, and said mixing chamber provides a fuel mixture to said anode chamber via a fuel mixture valve.

2. The fuel cell system according to claim 1, wherein said water chamber is in communication with said cathode chamber via a cathode chamber valve.

3. The fuel cell system according to claim 1, wherein said first vent is operable to release pressure within said anode chamber.

4. The fuel cell system according to claim 1, wherein said first vent is operable to equalize pressure within said anode chamber with ambient pressure.

5. The fuel cell system according to claim 1, wherein said second vent is operable to release pressure within said mixing chamber.

6. The fuel cell system according to claim 1, wherein said second vent is operable to equalize pressure within said mixing chamber with ambient pressure.

7. The fuel cell system according to claim 1, wherein at least one gas impermeable membrane is placed within a respective chamber to prevent said effluent gas from mixing with a liquid stored within said respective chamber.

8. The fuel cell system according to claim 1, wherein said fuel cell is a direct oxidation fuel cell.

9. The fuel cell system according to claims 1, wherein said fuel comprises a carbonaceous fuel.

10. The fuel cell system according to claim 9, wherein said fuel comprises methanol.

11. The fuel cell system according to claim 1, further comprising a controller.

12. The fuel cell system according to claim 1, wherein said controller includes a timer for tracking the amount of time said fuel cell generates electrical energy.

13. The fuel cell system according to claim 1, wherein said controller includes an electric meter for monitoring an amount of electricity produced by said fuel cell.

14. The fuel cell system according to claim 1, further comprising a diffusion layer provided in at least one of said anode chamber and said cathode chamber.

15. The fuel cell system according to claim 1, wherein said system is used in conjunction with a bipolar stack.

16. The fuel cell system according to claim 1, wherein said system is used in conjunction with a plurality of protonically conductive membranes.

17. The fuel cell system according to claim 16, wherein said plurality of protonically conductive membranes are assembled substantially in a single plane.

18. A method for moving a liquid between chambers of a fuel cell system comprising:
    sealing off an anode chamber and a first chamber having a liquid stored therein of said fuel cell system from external pressure creating a closed sub-system;
    allowing an effluent gas produced in said anode chamber to freely flow between said anode chamber and said first chamber;
    storing a portion of said effluent gas in said first chamber, wherein a first pressure of said sub-system increases due to an increasing volume of said effluent gas being produced in said anode chamber;
    sealing off said first chamber from said anode chamber, wherein said effluent gas substantially ceases to flow between said anode chamber and said first chamber;
    creating a pressure differential between a second chamber and said first chamber by lowering a second pressure in said second chamber to a point below said first pressure;
    opening a conduit between said first chamber and said second chamber, wherein as a result of said pressure differential, said liquid stored in said first chamber flows into said second chamber via said second conduit.

19. The method according to claim 18, wherein said first chamber is a mixing chamber, said liquid is a fuel mixture, and said second chamber is said anode chamber.

20. The method according to claim 18, wherein said first chamber is a liquid chamber, said liquid is water and said second chamber is a mixing chamber for mixing fuel and water to form a fuel mixture for supplying to said anode chamber.

21. The method according to claim 18, wherein said first chamber is a fuel chamber, said liquid is fuel and said second chamber is a mixing chamber for mixing fuel and water to form a fuel mixture for supplying to said anode chamber.

22. The method according to claim 18, wherein said first chamber is said anode chamber, said liquid is liquid effluent and said second chamber is a mixing chamber for mixing fuel and water to form a fuel mixture for supplying to said anode chamber.

23. A method for agitating a liquid stored in a first chamber of a fuel cell system comprising:

sealing off said anode chamber from external pressure;

storing an effluent gas produced in said anode chamber within said anode chamber, wherein an anode pressure of said anode chamber increases over a period of time due to an increasing volume of said effluent gas being produced;

creating a pressure differential between said first chamber and said anode chamber by lowering a first pressure of a first chamber to a point below said anode pressure;

opening a conduit between said anode chamber and said first chamber, wherein as a result of said pressure differential, said effluent gas stored in said anode chamber flows into said first chamber agitating said liquid stored within said first chamber.

24. The method according to claim 23, wherein said first pressure is lowered by venting said first chamber to an environment having a lower pressure than said anode chamber.

25. The method according to claim 24, wherein said environment is an ambient air pressure.

26. In a fuel cell system comprising:

a housing defining an anode chamber and a cathode chamber and including a catalyst, a protonically conductive but electronically non-conductive membrane positioned between said anode chamber and said cathode chamber and a first vent;

a fuel chamber in gaseous communication with said anode chamber via a first valve;

a liquid chamber in communication with said anode chamber via a second valve; and a mixing chamber having a second vent, said mixing chamber in communication with said anode chamber via a third valve, wherein said mixing chamber receives fuel from said fuel chamber via a fuel valve, liquid from said liquid chamber via a liquid valve, and liquid effluent from said anode chamber via a liquid effluent valve, and said mixing chamber provides a fuel mixture to said anode chamber via a fuel mixture valve, a method for moving a fuel mixture stored within said mixing chamber to said anode chamber comprising:

closing said first vent, said second vent, said first valve, said second valve, said fuel valve, said fuel mixture valve, said liquid valve, and said liquid effluent valve, wherein a closed sub-system is established between said anode chamber and said mixing chamber;

opening said third valve allowing an effluent gas produced in said anode chamber to freely flow between said anode chamber and said mixing chamber;

storing a portion of said effluent gas produced in said anode chamber in said mixing chamber, wherein a volume of said effluent gas establishes a first pressure within said closed sub-system, said first pressure becoming increasingly higher as said effluent gas is produced;

closing said third valve to isolate said mixing chamber from said anode chamber;

opening said first vent to release said first pressure in said anode chamber such that a second pressure is established within said anode chamber lower than said first pressure creating a pressure differential between said mixing chamber and said anode chamber;

closing said first vent;

opening said fuel mixture valve and allowing said fuel mixture to flow from said mixing chamber into said anode chamber as a result of said pressure differential.

27. In a fuel cell system comprising:

a housing defining an anode chamber and a cathode chamber and including a catalyst, a protonically conductive but electronically non-conductive membrane positioned between said anode chamber and said cathode chamber and a first vent;

a fuel chamber in gaseous communication with said anode chamber via a first valve;

a water chamber in communication with said anode chamber via a second valve; and a mixing chamber having a second vent, said mixing chamber in communication with said anode chamber via a third valve, wherein said mixing chamber receives fuel from said fuel chamber via a fuel valve, water from said water chamber via a water valve, and liquid effluent from said anode chamber via a liquid effluent valve, and said mixing chamber provides a fuel mixture to said anode chamber via a fuel mixture valve, a method for moving liquid stored within said liquid chamber to said mixing chamber comprising:

closing said first vent, said second vent, said first valve, said third valve, said fuel valve, said fuel mixture valve, said water valve, and said liquid effluent valve, wherein a closed sub-system is established between said anode chamber and said liquid chamber;

opening said second valve allowing an effluent gas produced in said anode chamber to freely flow between said anode chamber and said water chamber;

storing a portion of said effluent gas produced in said anode chamber in said water chamber, wherein a volume of said effluent gas establishes a first pressure within said closed sub-system, said first pressure becoming increasingly higher as said effluent gas is produced;

closing said second valve to isolate said water chamber from said anode chamber;

opening said second vent to lower a second pressure in said mixing chamber below said first pressure creating a pressure differential between said water chamber and said mixing chamber;

closing said second vent;

opening said water valve and allowing liquid to flow from said water chamber into said mixing chamber as a result of said pressure differential.

28. In a fuel cell system comprising:

a housing defining an anode chamber and a cathode chamber and including a catalyst, a protonically conductive membrane positioned between said anode chamber and said cathode chamber and a first vent;

a fuel chamber in gaseous communication with said anode chamber via a first valve;

a water chamber in communication with said anode chamber via a second valve; and a mixing chamber having a second vent, said mixing chamber in communication with said anode chamber via a third valve, wherein said mixing chamber receives fuel from said fuel chamber via a fuel valve, water from said water chamber via a water valve, and liquid effluent from said anode chamber via a liquid effluent valve, and said mixing chamber provides a fuel mixture to said anode chamber via a fuel mixture valve, a method for moving fuel stored within said fuel chamber to said mixing chamber comprising:

closing said first vent, said second vent, said second valve, said third valve, said fuel valve, said fuel mixture valve, said water valve, and said liquid effluent valve, wherein a closed sub-system is established between said anode chamber and said water chamber;

opening said first valve allowing an effluent gas produced in said anode chamber to freely flow between said anode chamber and said fuel chamber;

storing a portion of said effluent gas produced in said anode chamber in said fuel chamber, wherein a volume of said effluent gas establishes a first pressure within said closed sub-system, said first pressure becoming increasingly higher as said effluent gas is produced;

closing said first valve to isolate said fuel chamber from said anode chamber;

opening said second vent to lower a second pressure below said first pressure creating a pressure differential between said fuel chamber and said mixing chamber;

closing said second vent;

opening said fuel valve and allowing fuel to flow from said fuel chamber into said mixing chamber as a result of said pressure differential.

29. In a fuel cell system comprising:

a housing defining an anode chamber and a cathode chamber and including a catalyst and a protonically conductive membrane positioned between said anode chamber and said cathode chamber, wherein said anode chamber includes a first vent;

a fuel chamber in gaseous communication with said anode chamber via a first valve;

a water chamber in communication with said anode chamber via a second valve; and a mixing chamber having a second vent, said mixing chamber in communication with said anode chamber via a third valve, wherein said mixing chamber receives fuel from said fuel chamber via a fuel valve, liquid from said liquid chamber via a liquid valve, and liquid effluent from said anode chamber via a liquid effluent valve, and said mixing chamber provides a fuel mixture to said anode chamber via a fuel mixture valve, a method for agitating a fuel mixture stored within said mixing chamber comprising:

closing said first vent, said second vent, said first valve, said second valve, said third valve, said fuel valve, said fuel mixture valve, said water valve, and said liquid effluent valve, wherein a closed sub-system is established between said anode chamber and said water chamber;

storing an effluent gas produced in said anode chamber in said anode chamber, wherein a volume of said effluent gas establishes a first pressure within said anode chamber that becomes increasingly higher as said effluent gas is produced;

opening said second vent and said third valve allowing said stored effluent gas to flow from said anode chamber into said mixing chamber and out said second vent, wherein said fuel mixture stored in said mixing chamber is agitated as a result of said effluent gas flowing into said mixing chamber and out of said second vent as a result of said pressure differential.

30. A fuel cell system comprising:

a housing defining an anode chamber and a cathode chamber and including a catalyst and a protonically conductive but electronically non-conductive membrane positioned between said anode chamber and said cathode chamber, wherein said anode chamber includes a first vent;

a fuel chamber in gaseous communication with said anode chamber via a first valve;

a water chamber; and a pump, wherein said pump receives fuel from said fuel chamber via a fuel valve, water from said water chamber, and liquid effluent from said anode chamber, and said pump provides a fuel mixture to said anode chamber.

31. In a fuel cell system comprising:

a housing defining an anode chamber and a cathode chamber and including a catalyst and a protonically conductive but electronically non-conductive membrane positioned between said anode chamber and said cathode chamber, wherein said anode chamber includes a vent;

a fuel chamber in gaseous communication with said anode chamber via a first valve;

a water chamber; and a pump, wherein said pump receives fuel from said fuel chamber via a fuel valve, water from said water chamber, and liquid effluent from said anode chamber, and said pump provides a fuel mixture to said anode chamber;

a method for supplying fuel to said pump comprising:

closing said fuel valve;

opening said first valve allowing an effluent gas produced in said anode chamber to freely flow between said anode chamber and said fuel chamber establishing a closed sub-system between said anode chamber and said fuel chamber;

storing a portion of said effluent gas produced in said anode chamber in said fuel chamber, wherein a volume of said effluent gas establishes a first pressure within said closed sub-system, said first pressure becoming increasingly higher as said effluent gas is produced and wherein said first pressure is higher than a second pressure of said pump establishing a pressure differential there between;

closing said first valve to isolate said fuel chamber from said anode chamber;

opening said fuel valve and allowing fuel to flow from said fuel chamber into said pump as a result of said pressure differential.

32. In a fuel cell system comprising:

a housing defining an anode chamber and a cathode chamber and including a catalyst, a protonically conductive but electronically non-conductive membrane positioned between said anode chamber and said cathode chamber and a first vent;

a fuel chamber in gaseous communication with said anode chamber via a first valve;

a water chamber in communication with said anode chamber via a second valve; and a mixing chamber having a second vent, said mixing chamber in communication with said anode chamber via a third valve, wherein
said mixing chamber receives fuel from said fuel chamber via a fuel valve,
water from said water chamber via a liquid valve, and liquid effluent from said anode chamber via a liquid effluent valve, and
said mixing chamber provides a fuel mixture to said anode chamber via a fuel mixture conduit via a fuel mixture valve, a method for moving liquid effluent from said anode chamber to said mixing chamber comprising:
closing said first vent, said second vent, said first valve, said second valve, said third valve, said fuel valve, said fuel mixture valve, said water valve, and said liquid effluent valve, wherein a closed sub-system is established between said anode chamber and said mixing chamber;
storing an effluent gas produced in said anode chamber in said anode chamber, wherein a volume of said effluent gas establishes a first pressure within said anode chamber that becomes increasingly higher as said effluent gas is produced;
opening said second vent and said effluent valve allowing an effluent liquid stored in said anode chamber to flow from said anode chamber into said mixing chamber as a result of said pressure differential.

33. A fuel cell system comprising:
a housing defining an anode chamber and a cathode chamber and including a catalyst, a protonically conductive but electronically non-conductive membrane positioned between said anode chamber and said cathode chamber and a first vent;
a first conduit having a first end for receiving liquid effluent from said anode chamber and a second end for supplying a mixture of fuel and liquid effluent to said anode chamber; and
a fuel chamber in gaseous communication with said anode chamber via a first valve
and in liquid communication with said first conduit via a fuel valve.

34. The fuel cell system according to claim 33, wherein a water chamber is in communication with said cathode chamber for receiving effluents generated therein.

35. A fuel cell system comprising:
a housing defining an anode chamber and a cathode chamber and including a catalyst, a protonically conductive but electronically non-conductive membrane positioned between said anode chamber and said cathode chamber and a vent;
a fuel chamber in gaseous communication with said anode chamber via a first valve and in liquid communication with said anode chamber via a fuel valve.

36. In a fuel cell system comprising:
a housing defining an anode chamber and a cathode chamber and including a catalyst and a protonically conductive but electronically non-conductive membrane positioned between said anode chamber and said cathode chamber, wherein said anode chamber includes a vent;
a fuel chamber in gaseous communication with said anode chamber via a first valve and in liquid communication with said anode chamber via a fuel valve, a method for supplying fuel to said anode chamber comprising:
closing said fuel valve;
opening said first valve allowing an effluent gas produced in said anode chamber to freely flow between said anode chamber and said fuel chamber establishing a closed sub-system between said anode chamber and said fuel chamber;
storing a portion of said effluent gas produced in said anode chamber in said fuel chamber, wherein a volume of said effluent gas establishes a first
pressure within said closed sub-system, said first pressure becoming increasingly higher as said effluent gas is produced;
closing said first valve to isolate said fuel chamber from said anode chamber;
opening said vent to lower said first pressure to a second pressure creating a pressure differential between said fuel chamber and said anode chamber;
opening said fuel valve and allowing fuel to flow from said fuel chamber into said anode chamber as a result of said pressure differential.

37. A method for controlling a concentration of fuel in a fuel-water mixture for a direct oxidation fuel cell system comprising:
determining a first concentration level of fuel in a fuel-water mixture within said direct oxidation fuel cell system;
comparing said first concentration level to a second required concentration level required for a particular operating condition, wherein
fuel is added to said fuel-water mixture when said first concentration level is less than said second required concentration level, and wherein
water is added to said fuel-water mixture when said first concentration level is higher than said second required concentration level.

38. A system for controlling a concentration of fuel in a fuel-water mixture for a direct oxidation fuel cell system comprising:
a housing defining an anode chamber and a cathode chamber, said housing also including a catalyst and a protonically conductive but electronically non-conductive membrane, wherein said anode includes a liquid-fuel mixture;
a fuel concentration sensor for determining a first concentration level of fuel in said fuel-water mixture;
a fuel chamber for storage of fuel, said fuel chamber in communication with said fuel-water mixture;
a water chamber for storage of liquid, said water chamber in communication with said fuel-water mixture; and
a controller for controlling a first flow of fuel to said fuel-water mixture, for controlling a second flow of liquid to said fuel-water mixture, and including a memory having a look-up table stored therein, said look-up table including operating condition data and associated fuel concentration levels.

* * * * *